United States Patent [19]

Hoyle, Burton J. et al.

[11] 4,409,910
[45] Oct. 18, 1983

[54] METHOD AND APPARATUS FOR PLANTING SEEDS WHILE CONDITIONING SOIL

[75] Inventors: Hoyle, Burton J., Five Points; Timothy B. K. Lee, Sacramento, both of Calif.

[73] Assignee: The Regents of The University of California, Berkeley, Calif.

[21] Appl. No.: 387,330

[22] Filed: Jun. 11, 1982

Related U.S. Application Data

[63] Continuation-in-part of Ser. No. 183,802, Sep. 3, 1980, abandoned.

[51] Int. Cl.³ ............................................. A01C 23/02
[52] U.S. Cl. ................................. 111/1; 47/DIG. 10; 111/7; 111/52; 111/73; 111/85; 172/45; 172/701
[58] Field of Search ................................ 111/1, 6–13, 111/52, 73, 89, 85; 172/45, 120, 123, 701; 47/9, 58, DIG. 9, DIG. 10

[56] References Cited

U.S. PATENT DOCUMENTS

| | | | |
|---|---|---|---|
| 2,364,958 | 12/1944 | Drennan | 111/80 |
| 2,988,025 | 6/1961 | Johnston | 111/6 |
| 2,988,026 | 6/1961 | Heckathorn | 111/7 |
| 3,194,193 | 7/1965 | Walters | 111/6 |
| 3,316,865 | 5/1967 | Williams | 111/6 |
| 3,317,088 | 5/1967 | Funk et al. | 111/85 X |
| 3,347,188 | 10/1967 | Richey | 111/10 |
| 3,398,707 | 8/1968 | McClenny | 111/1 X |
| 3,533,366 | 10/1970 | Francom | 111/7 |
| 3,538,987 | 11/1970 | Taylor | 172/123 |
| 3,605,657 | 9/1971 | Brannan | 111/85 |
| 3,610,184 | 10/1971 | Carroll et al. | 111/7 |
| 3,653,550 | 4/1972 | Williams | 111/6 X |
| 3,661,213 | 5/1972 | Taylor | 172/123 X |
| 3,680,504 | 8/1972 | Seebald | 111/6 |
| 3,741,137 | 6/1973 | Eisenhordt | 111/6 |
| 3,742,877 | 7/1973 | Coffee | 111/6 |
| 3,773,224 | 11/1973 | Winslow | 111/77 X |
| 3,866,552 | 2/1975 | Leidig | 111/85 |
| 3,895,589 | 7/1975 | Garner et al. | 111/7 |
| 3,926,131 | 12/1975 | Collins | 111/6 |
| 3,958,520 | 5/1976 | Cantone | 111/6 |
| 3,970,012 | 7/1976 | Jones | 111/6 |
| 4,009,666 | 3/1977 | Russell et al. | 111/6 |
| 4,095,535 | 1/1978 | Van Der Lely et al. | 111/6 |
| 4,178,860 | 12/1979 | Hines et al. | 111/7 |
| 4,186,671 | 2/1980 | Huang | 111/2 |
| 4,187,916 | 2/1980 | Harden et al. | 172/166 |
| 4,208,973 | 6/1980 | Baer et al. | 111/1 |
| 4,256,182 | 3/1981 | Nething | 172/45 |

FOREIGN PATENT DOCUMENTS

| | | | |
|---|---|---|---|
| 2146696 | 4/1972 | Fed. Rep. of Germany | 111/85 |
| 1356084 | 6/1964 | France | 111/85 |
| 2330296 | 6/1977 | France | 111/85 |
| 1217473 | 12/1970 | United Kingdom | 111/85 |

*Primary Examiner*—James R. Feyrer
*Attorney, Agent, or Firm*—Owen, Wickersham & Erickson

[57] ABSTRACT

Method and apparatus for planting seeds in a field. An anti-cohesion liquid chemical is injected at 30 to 50 p.s.i. into a narrow ribbon of soil, no more than two inches wide and two inches deep. Immediately thereafter, the soil ribbon is vigorously agitated at 900 to 2000 r.p.m. to insure coating of all of the soil particles with the chemical to a depth below that at which the seed is to be planted. The seeds are then placed at precise locations within and covered by the treated soil, and the soil over them is firmed.

22 Claims, 15 Drawing Figures

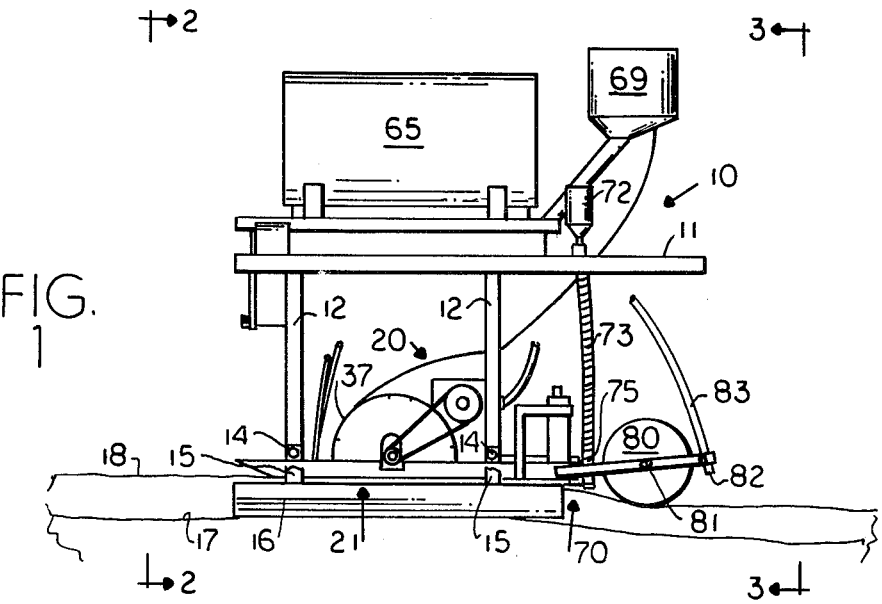
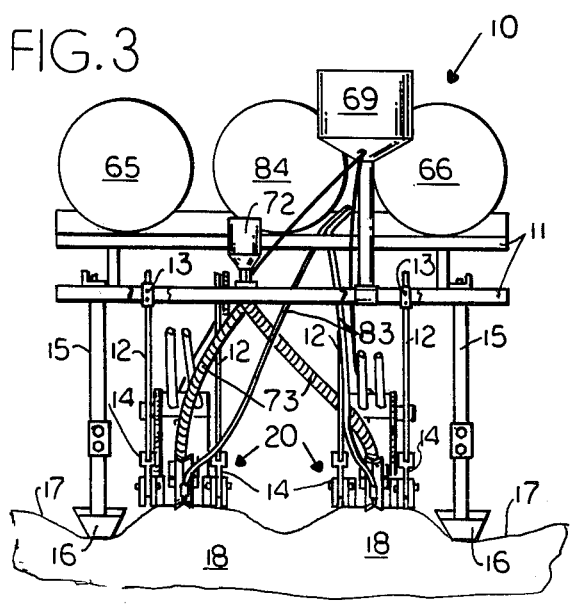
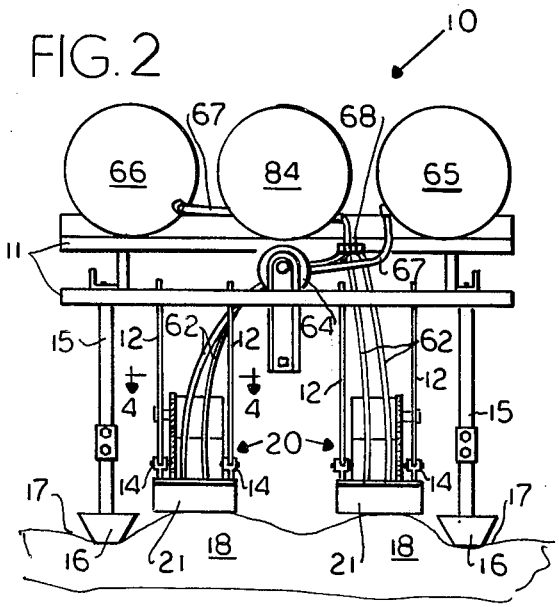
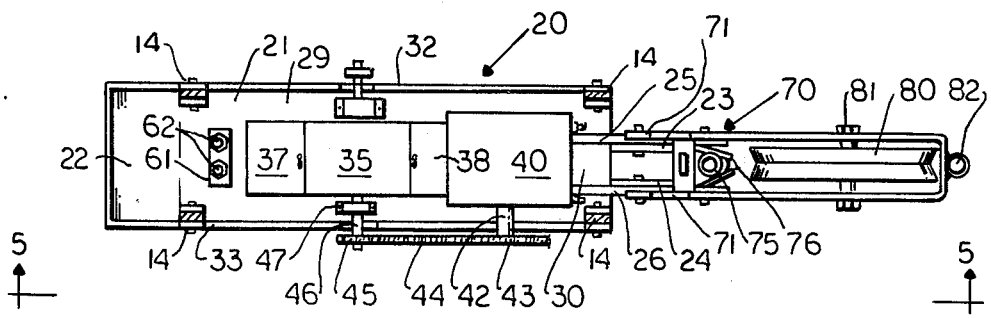

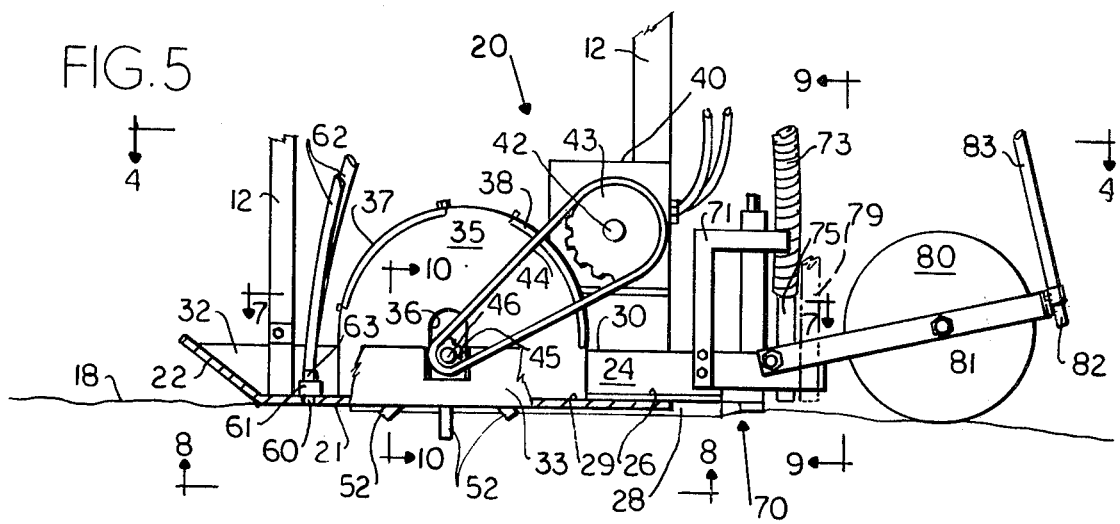
FIG.5
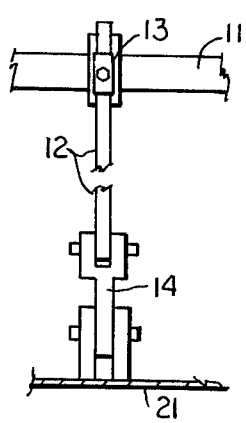
FIG.6
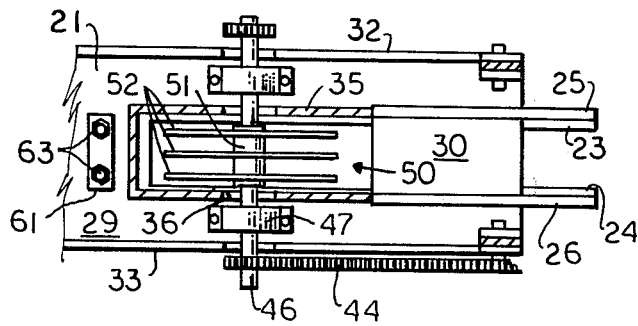
FIG.7
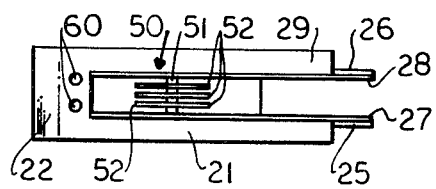
FIG.8
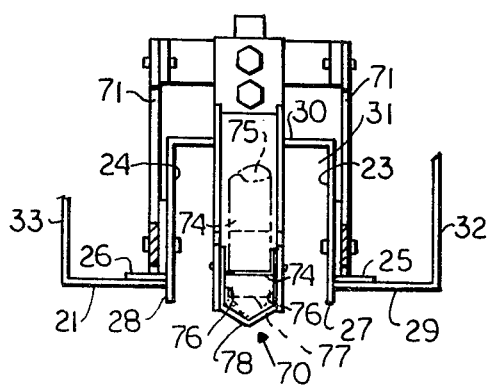
FIG.9
FIG.10

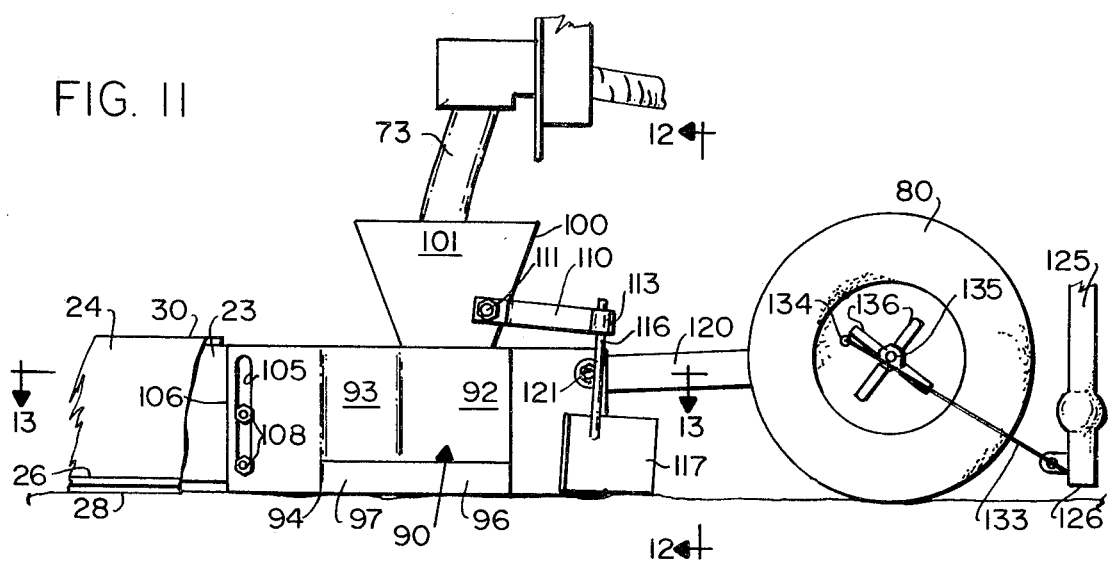
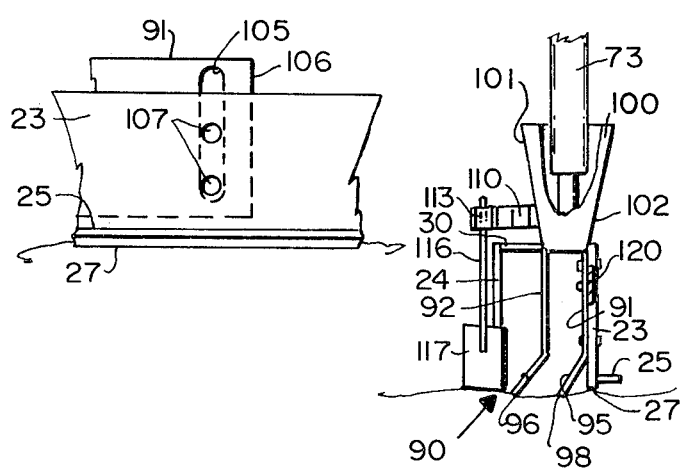
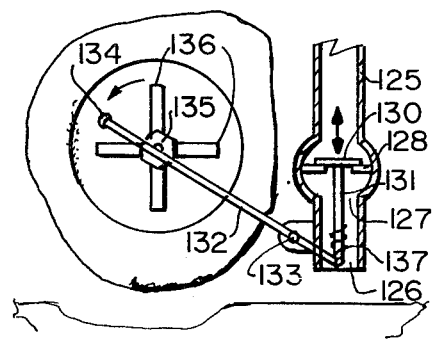
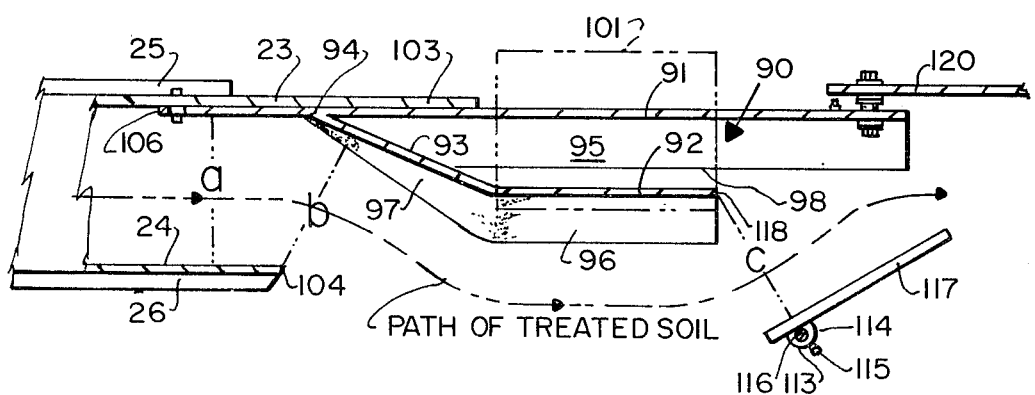

METHOD AND APPARATUS FOR PLANTING SEEDS WHILE CONDITIONING SOIL

REFERENCE TO RELATED APPLICATION

This application is a continuation-in-part of application Ser. No. 183,802, filed Sept. 3, 1980, now abandoned.

This invention relates to apparatus and method for preparing soil and sowing seed therein so as to enhance seedling emergence.

BACKGROUND OF THE INVENTION

Seedling emergence failure is a worldwide problem which occurs unpredictably on many soil types. Many conditions, including poor seed, salty soils, insects, disease, and wind contribute to the problem, but most emergence failures take place in good soils which develop a mechanical impedance physically preventing emergence. Surface crusts one millimeter thick or more are the most easily recognized forms of impedance. Other forms of impedance include, mini-pockets of unique soil structure, high-density sub-surface layers, and variations in the size and bonding of soil aggregate particles; all of these limit emergence by causing mechanical impedance and by limiting soil aeration. In addition, well granulated and aerated soil grains sometimes bond so tightly at points of contact that they prevent sufficient movement of the soil grains to allow the seedling to pass through.

Research for eliminating impedance problems has been widespread for over fifty years, but no economical or generally acceptable material or system is in use at this time. Most anti-crustants in commercial use are applied as surface sprays and are used only for attempted control of the visible surface crust. The system involved in this invention is economical, reliable, and eliminates all types of impedance mentioned from slightly below seed depth to the surface.

SUMMARY OF THE INVENTION

Impedance in the seed zone can be substantially eliminated by the present invention. In the method of the invention, an anti-cohesion chemical is injected into a narrow ribbon of soil in a bed that has been previously prepared, and this ribbon of soil is then very vigorously agitated to insure coating all of the soil particles to below seed depth; the seed is then placed precisely where desired and is covered with the treated soil. Additional materials or chemicals, such as herbicides, may be added or combined, as desired, within the system. The treated seed line or ribbon is, typically, an area $1\frac{1}{2}''$ to $2\frac{1}{2}''$ wide and $\frac{1}{2}''$ to $2''$ deep. It may be even narrower or shallower or both. The vigorous mixing of the damp soil with the anti-cohesion chemical improves spatial distribution and clod size, lowers the density, and reduces very small particles by aggregation or by causing them to adhere to larger clods. The anti-cohesion chemical is relatively expensive; so it is uneconomical to spray the entire width of the bed. For the purpose here, there is no use in spraying any deeper or wider than needed. For shallow-planted seeds, there is no need to go below $\frac{1}{2}''$ deep; for deeper-planted seeds $1''$ to $2''$ depth is still plenty. The width need rarely be greater than $1\frac{1}{2}''$ or $2''$, and $2\frac{1}{2}''$ is a practical maximum to make the operation economical.

The machine of this invention combines the soil conditioning and the planting into a single operation. The machine includes jet injector means for injecting the liquid anti-cohesion chemical into the soil bed along a relatively narrow band, or ribbon, mixing means following the injector means for vigorously agitating the soil within the band or ribbon to insure coating of all soil particles to below seed depth, and planting means for placing the seed precisely in the treated band.

Essential features which distinguish this invention from those currently in use, include: (1) jet injection of chemical into the soil, preferably, at 30 to 50 p.s.i. places the chemical below seed depth and also provides some agitation and mixing, whereas conventional machines use a fan spray which merely applies chemical to the surface; (2) high speed agitation (900–2000 r.p.m. depending on type and condition of soil) produces uniform soil coating to below seed depth, whereas conventional machines use lower-speed blade rotators (400–600 r.p.m.) which leave irregularly treated soil and speeds higher than 2000 leave the soil too powder like; and (3) the planting shoe is rigidly attached to a skid plate in such a manner that seed is placed precisely in the treated band of soil, whereas in conventional machines, the planting shoe, generally on wheels, trails behind the skid plate, and placement of seed is not precise.

Additional unique features are given in the detailed description below.

The invention thus combines soil conditioning and planting in one operation. The term 'soil conditioning' as used here means physically decreasing the bulk density in a band of the seed row by adding water and anti-cohesion chemical and then agitating throughly. Use of the stabilizing anti-cohesion chemical prevents cohesion of the soil particles and formation of a crust, and it keeps the soil particles from shrinking or settling back into their original high-density condition. The prior art systems in use today do not treat a narrow band or ribbon of soil, and they have no provision for preserving a low density condition. Soil conditioning by this machine also has the capacity of aggregating the soil particles, changing the very fine and undesirable particles into larger and granular ones of high desirability. This aggregation is a function of increasing the amount of or changing the chemical nature of the liquid being used. Soil conditioning is also understood to mean creating soils of uniform size and texture,—a desirable thing to do.

This new system is also unique in that it confines all the operations in what may be called a tunnel. By this expedient the soil being conditioned is confined and is not allowed to mix with untreated soils.

By this system, the seed is positively kept from being planted below or to one side of the treated area, and the seed is protected from being covered with untreated or irregularly shaped soil. This feature is not present in any other planter-conditioner using natural in-place soil.

The present invention contrasts with planting systems which dig a hole and plant a uniform mixture of seed and prepared soil into the hole. The planter system of this invention uses in-place soil, avoiding the expense and logistics of importing vast amounts of foreign material, mixing it, and introducing it into the soil.

The new machine is unique in its ability to be adjusted to proper mixing speeds for optimum chemical requirements and for optimum soil granulation. Both operations are essential for wide commercial field use. The recommended speeds are considerably higher than those used in other field operations.

Another unique feature is the ability to condition soil with both liquid and dry materials at the same time or in combination.

The machine is also unique in that the force of the liquid injected into the soil is used as part of the agitation and mixing procedure.

Of great importance are the increase in soil bulk which takes place and which reduces density, and the ability of the process to maintain this zone of improved aeration, water characteristics, and temperature, and plant into this zone. The result is that there is no crusting and very low soil impedance during and after emergence.

Primary Factors Affecting Seedling Emergence in Good Soil

Germination itself requires only adequate water, aeration and temperature, and the standard germination test has optimum levels of each.

Emergence, however, requires adequate water, aeration, temperature, and also low impedance. The standard germination test pays no attention to impedance, but field seed beds have stress levels of each of these four factors. Impedance itself affects development of the stress levels and of changes in water, air, and temperature.

Thus, the same factors that affect the biological processes of seed germination and growth, also affect the physical development of impedance and crusting. It should be noted that emergence and impedance are independently time dependent. The rate of seedling development is dependent primarily on the time required for accumulation of heat and oxygen units. Oxygen stress due to insufficient aeration cancels out the effect of accumulated heat units. The rate of impedance development is dependent on the time needed for changes in soil moisture, for changes in bonding forces, and for mini-physical changes within the soil, caused by rain, wind, and cultural practices.

When the rate of seedling development is faster than that of the development of impedance stress, the seedling will emerge. When this happens, treatment differences will not necessarily show in a test plot.

In addition to the visible crust on the surface, seedlings are mechanically impeded by mini-pockets below the surface, consisting of high soil density and aggregated variability. In well-granulated soil there is often a condition where the soil grains are so tightly bonded together that they prevent the soil movement necessary to allow seedlings to pass through. Since a surface crust is only one form of impedance to seedling emergence, "anti-impedance control" is a better term to use than "anti-crustant control", for it emphasizes the fact that eliminating a surface crust will not correct the other impedance problems.

Water, aeration, temperature, and impedance are each, independently and in combination, capable of causing seedling failure when at stress levels. At any adequate temperature the remaining factors (water, aeration, and impedance) can be combined into eight combinations of seed-bed conditions. For example, aeration and water may be satisfactory but impedance at stressing levels will prevent or interfere in the emergence. Or another example, water and impedance may be at satisfactory levels, but aeration at stressing levels will stop emergence. Once of the eight possible combinations to be found in a seed-bed, only one—the one where water, aeration, and impedance are all satisfactory will permit emergence. At any temperature adequate for emergence, impedance stress, which included crusting, is only one of the three independent variables, water, aeration, and impedance, which causes emergence problems. Thus, in four of these eight combinations, impedance is not a problem, and yet emergence will fail.

The chemical, biological, and physiological makeup of the seed determines its ability to germinate and grow under the many seed-bed combinations of water, aeration, temperature, and impedance. By definition, vigorous seed will emerge better under more conditions of stress than weak seed. At the present time there are no known or accepted commercially significant methods of measuring seed vigor.

Both vigorous and non-vigorous seed will emerge equally well from seed-beds where water, aeration, temperature, and impedance are nearly optimum. No ability has been demonstrated to increase the vigor of seed to exert more force to push through high-impedance soil. Even if this were possible, it would be necessary to double or triple the pushing force in order to obtain significant results. Thus, seed at the time of planting has a fixed energy and development force with maximum value at optimum water, aeration, and temperature. Its field performance can only be lower as affected by stresses of water, aeration, temperature, and impedance.

Unlike the seed, the seed-bed is in constant change. As soils become wet and then dry out, the aggregates shift and rotate. Seedlings depend on such movement in order to emerge. The soil in the seed-bed is a mixture of different aggregate sizes, which are altered with time, and some aggregate sizes are superior to others. Aggregates can disintegrate into smaller ones, primarily by tillage, water, and wind.

Aeration is brought about by the space between clods, called interaggregate pore space. Water and air compete for the same pore space. When one is high, the other is low. As aggregates get smaller, they fill some of the pore space, increase the soil density, reduce aeration, and increase aggregate surface contact with each other. Crusting the impedance increase as aggregates get smaller, and bonding becomes tighter. Soils that stick tightly together as they dry, also tend to swell or shrink, and they crack and form crusts. Soils that do not stick together remain loose and mobile as they change from wet to dry and vice versa. These are desirable, non-impedance-forming soils.

From the above, it is evident how a seed-bed can become limiting in water, aeration, temperature, and resistance. It is evident that many more seed emergence problems are seed-bed-related rather than seed-related.

The seed-bed is the primary cause of controllable emergence problems. As complex as seed emergence appears to be, there are a very few simple corrections which are very effective:

1. creation of seed beds of uniform aggregate size,
2. reduction of soil density, and
3. prevention of soil aggregates from bonding or sticking together.

Accomplishing these three things will solve nearly all emergence problems. These problems cannot be solved by surface sprays. However, the present invention solves these problems by high-speed mixing of a small amount of water and anti-cohesive chemical into the seed line to a depth slightly greater than that at which the seed is planted. Uniform aggregates are formed, density is reduced, and the anti-cohesive chemical prevents the aggregates from sticking together.

Of course, there are secondary factors that affect stand and emergence. For example, salt and other toxic materials in the soil, birds, rodents, insects, disease, etc. must be identified as probable causes when there is a stand failure.

In evaluating stand emergence trials, the following factors should be considered:
(1) It is not uncommon to hold a trial in a field that has excellent physical conditions with no significant emergence stresses. Under such conditions, all trials may be expected to respond similarly.
(2) It is not uncommon to select a particular time period when weather and temperature enhance and accelerate emergence, before impedance becomes a problem. A light shower will soften or otherwise affect a forming crust, or some other factor such as wind, will cause very serious problems.
(3) When birds and insects are a problem, it is not uncommon for them to destroy the early emerging plants while later-emerging ones are not affected.
(4) Another set of problems has to do with irrigation management. Some treatments dry faster than others, making it impossible to optimize irrigation for all. Consider a field about ready to emerge, where water stress will affect emergence. A particular irrigation may correct the water stress, and soften a crust, but also create an aeration problem, depending on the treatment.
(5) Finally, available instruments are inadequate to measure impedance and aeration in the seed-emerging zone.

BRIEF DESCRIPTION OF THE DRAWINGS

FIG. 1 is a view in side elevation of a soil-treating and seed-planting machine embodying the principles of the invention. The view looks from the right in FIG. 2 and from the left in FIG. 3. The main, upper portion of the legs supporting the ground-engaging foot have been broken off to show the links behind them.

FIG. 2 is a view in front elevation of the machine in FIG. 1.

FIG. 3 is a view in rear elevation of the machine of FIG. 1.

FIG. 4 is an enlarged top plan view, with some parts shown in section and taken along the line 4—4 in each of FIGS. 2 and 5, of a sub-assembly of the machine of FIGS. 1-3.

FIG. 5 is a view in side elevation and partly in section, taken along the line 5—5 in FIG. 4 of the sub-assembly of FIG. 4.

FIG. 6 is an enlarged detail view of the suspension mechanism connecting the sub-assembly of FIGS. 4 and 5 to the rest of the machine of FIG. 5.

FIG. 7 is a fragmentary view in section taken along the line 7—7 in FIG. 5.

FIG. 8 is a fragmentary bottom view viewed along the line 8—8 in FIG. 5.

FIG. 9 is a view in section taken along the line 9—9 in FIG. 5.

FIG. 10 is a fragmentary view in section taken along the line 10—10 in FIG. 5.

FIG. 11 is a fragmentary view in side elevation of the rear portion of a modified form of sub-assembly.

FIG. 12 is a view in section taken along the line 12—12 in FIG. 11.

FIG. 13 is an enlarged view in section taken along the line 13—13 in FIG. 11.

FIG. 14 is a fragmentary detail view in rear elevation of the securing of the shoe to its supporting wall.

FIG. 15 is a fragmentary view in section of a portion of the rearmost liquid-depositing pipe and, in elevation, the firming wheel and their related parts.

DESCRIPTION OF A PREFERRED EMBODIMENT OF THE MACHINE (FIGS. 1-10)

FIGS. 1-3 show a machine 10 for practicing the invention. The machine 10 is pulled by a tractor (not shown) across the field. It has a main frame 11 from which is suspended a plurality of sub-assemblies 20, two such being shown in these figures. Elongated suspension bars 12, preferably two on each side, join each sub-assembly 20 to the main frame 11; each suspension bar 12 is adjustably clamped to the main frame 11 by a clamp 13 (FIGS. 3 and 6), and at its lower end is pivotably connected to a link 14, which is, in turn, pivotally connected to a frame or sled 21 of the sub-assembly 20; the pivotal connections are loose at all times to enable relative pendulum movement.

Rigidly attached to each side of the main frame 11 are two legs 15 which support the main frame 11 on a pair of ground-engaging feet 16 that each ride in a furrow 17 on each side of the machine 10. The feet 16 and legs 15 thus support the main frame 11 and, through the main frame 11, the sub-assembly 20. The links 14 help to accommodate the sub-assembly 20 to temporary differences in the relative height above the furrows 17 of beds or hills 18 where the seeds are to be planted. The furrows 17 and the beds or hills 18 are not made by the device of the present invention; they are already there having been formed beforehand in any desired manner. The clamps 13 provide for the nominal difference in height between the hills 18 and the furrows 17, which may be nil (flat ground planting) or may be typically, two to eight inches. Thus, the sled 21 keeps intimate contact with the soil at all times, so that the treatment given by the sub-assembly 20 is done at a substantially uniform depth.

FIGS. 4 and 5 show that the sub-assembly's frame 21 is also a skid plate or sled having an upturned forward end 22. At and beyond the rear of the frame or skid plate 21, close to and on each side of the central longitudinal axis thereof, are two spaced-apart vertical walls or guide members 23 and 24 (see FIGS. 4, 5, 7, and 9). The guide members 23 and 24 are parallel to each other and have, at the rear (beyond the sled 21) respective outwardly extending horizontal flanges 25 and 26 (see FIG. 9) near their lower ends. They also have vertical depth guide members 27 and 28 extending down below the flanges 25 and 26 and penetrating below the soil surface. These guide members 27 and 28 extend forward under the sled 21 (see FIG. 8), and they define the depth of penetration into the soil below a flat bottom surface 29 of the sled 21.

An upper horizontal wall 30 joins the guide members 23 and 24 together and helps to provide between them a tunnel 31 (see FIG. 9) into which the treated soil can expand as its density is reduced, thereby retaining the soil in this tunnel 31 during its treatment. Outboard of the guide members 23 and 24 and also forward of it, the skid plate 21 has, along its sides, vertical rims 32 and 33.

In line with the guide members 23 and 24 and extending above a portion of them is a housing 35 having a vertically elongated side opening 36, and access door 37, and a feed port 38. To the rear of the housing 35 is a casing 40 containing a hydraulic motor having a drive shaft 42 on which is mounted a large sprocket wheel 43, which may, for example, be six inches in diameter. The wheel 43 drives a chain 44 which, in turn drives a smaller (e.g., two-inch) sprocket wheel 45. The wheel 45 is mounted on a shaft 46 that extends through and is journaled in a bearing 47 and then extends into the opening 36.

Inside the housing 35, is a bladed wheel assembly 50 (see FIG. 7), which may comprise three diametrically extending members 51 and provide six blades 52. The hydraulic motor, together with the difference in sprocket wheel diameters, drives the bladed assembly 50 at speeds which can be varied to accommodate types and conditions of soil, but at any rate lying to the range of 900-2000 r.p.m. When working in heavy clay having many clods as a result of plowing beforehand and where the clay is very dry and hard, there is need for higher speeds—of 1500 r.p.m. up to perhaps 2000 r.p.m., but speeds beyond that tend to result in an undesirable fine powder, which, when it gets wet can pack like concrete. With fine textured or sandy soil which is not cloddy, speeds around 1200 r.p.m. are better. For moist soil, the speed may need to be lowered to possibly as low as 900 r.p.m. Since many different conditions are likely to be met by any one machine, it is desirable for the machine to be able to vary the speeds, preferably throughout the 900-2000 r.p.m. range. When the soil is not too moist and not too hard and dry, medium speeds within this range are preferable.

The bearing 47 has spacers 53 (FIG. 10), and these and the extended opening 36 enable the operator to raise and lower the shaft 46 and thereby to adjust the depth to which the blades 52 extend into the soil. The blades 52 may have an outer diameter sufficient to penetrate about two inches into the soil. The length of the blades 52, the thickness of the spacers 53, and the depth of the guides 27 and 28 determines the depth of the treatment below the ground level over which the sled 21 rides.

Between the sled 21 and the housing 35 is a pair of openings 60 (FIG. 8) and above that a bracket 61 (FIG. 7), to which is attached at least one flexible liquid conduit 62, two being preferred and shown in FIG. 4, each terminating in a jet nozzle 63, for sending a high-velocity jet of liquid down against and into the soil, preferably at 30 to 50 p.s.i. The conduit 62 is preferably flexible so that it can be connected to a pressure supply source, such as a pump 64 (FIG. 2) for an anti-cohesion liquid chemical. Reservoir tanks 65 and 66 for this chemical are mounted on the main frame 11. Conduits 67 and 62 and a valve 68 enable the pump 64 to send the liquid from either tank 65 or 66 down through the jet nozzle 63 with considerable force and ejects it against and into the soil.

Thus, as the skid frame or sled 21 rides on the soil, the anti-cohesion liquid is injected along and into a narrow band or ribbon of soil, and, immediately thereafter, the soil and liquid in this narrow band or ribbon, are vigorously mixed together at 900 to 2000 r.p.m. by the blades 52.

The main frame 11 may also have a hopper 69 from which dry soil-conditioning materials may be fed to the opening 37 and mixed into the soil by the blades 52.

To the rear of the housing 35 and in or just to the rear of the tunnel 31 is rigidly mounted a planter shoe 70 (see FIG. 9), which is attached to a pair of mounting brackets 71 that are rigidly secured to the walls 23 and 24 at adjustable positions fore and aft to secure the most effective position of the shoe 70 under the field conditions encountered. A seed hopper 72 (FIGS. 1 and 3) (or other reservoir for seed) on the main frame 11 is connected by one or more flexible accordion-type corrugated conduits 73 to the planter shoe 70, so that the seed can be planted thereby. Because the sled 21 and the shoe 70 move up and down following the contours of the field, and because the links 14 adjust this movement so that the main frame 11 is not affected by them, the seed hopper 72 remains in a fixed position relative to the main frame 11, while the shoe 70 does not. The conduit 73 may be connected to the shoe 70 by a slip joint 74 with a small short conduit 75 extending up from the shoe 70. The small conduit 75 may move up and down while the conduit 73 is relatively stationary or is urged to move in or out at its lower end, like an accordion.

The shoe 70 is much narrower than the tunnel 31, and is regulated to place the seed at a desired depth in the center of the ribbon or band of soil. The shoe 70 comprises a pair or closely spaced vertical plates 76, between which lies a lower end 77 of the conduit 75 and a forward portion where the plates 76 are joined together by a curved bottom wall 78, to dig out a narrow trench determining the depth at which the seed is to be planted. Just to the rear of the conduits 73 there may be an additional conduit 79 for adding dry soil conditioner or fertilizing material on top of the seed.

To the rear of the planter shoe 70 is a pressing wheel 80 which firms the soil over the seed. It is mounted on a freely rotating shaft 81 which is journaled to the frame 21.

Finally, to the rear of the wheel 80 is a surface spray nozzle 82 with a conduit 83 leading from a container 84 to add either further anti-cohesion liquid or dampening water in a controlled amount on top of the firmed soil, if needed or desired.

Improved seed planting arrangement
(FIGS. 11–13)

In some instances, the seed planting shoe 70, shown in FIGS. 5 and 9, tends to obstruct passage of the treated soil, causing the treated soil to plug in the narrow passages on each side of the shoe 70, in between the shoe 70 and the guide members 23 and 24. As a result, the seed may not be uniformly covered, and the housing tends to fill up at all times. The modification shown in FIGS. 11–13 solves that problem by a novel seed planting shoe 90 located at the end of the tunnel and cooperating with the remainder of the apparatus.

The shoe 90 has a pair of parallel elongated vertical walls 91 and 92. The wall 91 is much longer than the wall 92, extending well forward of it and also far to its rear. A vertical wall 93, preferably integral with the wall 92, extends at an angle forward from the forward end of the wall 92 and is joined to and preferably welded to the wall 91 at a juncture line 94. To the rear of this juncture line 94, each of the walls 91, 92, and 93 has an inclined or sloping foot portion 95, 96, and 97, respectively. The lower edge 98 of the foot portion 95 (of the wall 91) lies halfway in between the path of the tunnel walls 23 and 24 and so close to and below the vertical wall 92 except where it is forward of the wall 92, and then it may join the wall 93.

The seed hopper 72 sends its seeds via the flexible tube 73 into a funnel 100, to compensate for the up-and-down and back-and-forth movement of the planter during operation. The funnel 100 may have four sloping walls, the lengthwise walls 101 and 102 being welded to the upper edges of the walls 91 and 92 respectively. The funnel 100 directs the seed down in between the walls 91 and 92, so that substantially all the seed falls on the foot portion 95 and slides down it and drops off its lower edge on to the soil therebelow.

In this arrangement, the guide member 23 may be lengthened, having a portion 103 extending rearwardly beyond the rear end 104 of the guide member 24, where the tunnel ends. The wall 91 extends forward of the juncture 94 and is provided with a vertical slot 105 near its forward edge 106. The slot 105 is aligned with a pair of round openings 107 through the guide member 23, so that a pair of bolts 108 can be used to secure the shoe 90 to the inside face of the guide member 23, the slot 105 enabling adjustment of the height of the shoe 90 relative to the guide member 23, thereby adjusting the planting depth of the seeds.

A bracket arm 110 is secured by a bolt 111 to the outside of the wall 101 of the funnel 100, extending rearwardly, and has, at its outboard end, a tubular member 113 having a cylindrical through opening 114 and a set screw 115. A rod 116 fits in the opening 114 and is held at a desired height and at a desired rotational position by the set screw 115. At the lower end of the rod 116 is a covering plate 117, which may be flat and rectangular and may be welded to the rod 116. The covering plate 117 is preferably held vertically at a desired angle to the wall 91, from which it is spaced; it is located to the rear and mostly to the outside of the wall 92 and its vertical rear edge 118.

The press wheel 80, located to the rear of the shoe 90, may be related to it by being mounted at the end of an arm 120 that is pivotally supported on a shaft 121 which is secured to the wall 91. The press wheel 80 may, in addition, perform an additional function in combination with a dispensing tube 125 shown in FIGS. 11 and 15.

The tube 125 is supported by the main frame 11 so that at least its terminal portion is vertical with its mouth 126 located one inch above the soil, after firming of that soil by the wheel 80. It replaces the conduit 83 and is supplied by the tank 84. Although primarily of use in combination with the sub-assembly 20, the combination of the firming wheel 80 and the tube 125 may also be used independently as a unit.

As shown in FIG. 15 the tube 125, which may be pipe about ¾" to 1" in diameter, is provided with a normally closed check valve, having a housing portion 127 a short distance above the mouth 126 and provided with an annular valve seat 128 and a valve closure member 130 thereabove. The member 130 has a depending stem 131 which is pivotally connected to a lever 132. The lever 132 is pivotally supported at a fulcrum 133 and has an inturned end portion 134 on the opposite side of the fulcrum 133 from the stem 131. The wheel 80, in this instance, has a hub 135 with a series (here four) radial members 136, each of which during rotation of the wheel 80 engages the lever 132, forcing the portion 134 down and thereby raising the stem 131 and the valve member 130, to open the valve and therefore deposit on the ground liquid from the tank 84 for a brief interval. A spring 137 closes the valve immediately thereafter. The deposits are therefore limited to spaced intervals along the ribbon of treated soil, with the spaces between deposits of much greater length. This means that the expensive chemical is deposited only at spaced locations—e.g., one foot on center, for a deposit about one inch in diameter. The lever arm 132 may be made in two parts, so that the distance of the end portion 134 from the fulcrum 133 may be lengthened or shortened, to prolong or shorten the dispensing of the liquid. The hub 135 may have its radial members replaceable to vary their number and thereby lengthen or shorten the distances between deposits.

The deposits are preferably a mix of the anticrustant with other enhancing material or adjuvants. For example, Nalco 2190 combined with an N-P-K fertilizer containing certain micronutrients such as soluble salts or chelates of iron and zinc.

It is important that a distance Z (FIG. 13) between the guide member 24 and the forward portion of the wall 91, a distance b between the rear edge 104 of the guide member 24 and the angled wall 93, and a distance c between the rear edge 118 of the wall 92 and the covering plate 117 all be substantially the same. By having $a=b=c$, any clods or obstructions which pass through at a can pass through at b and c instead of plugging there.

With the structure shown and described, the planting shoe 90 displaces and diverts most of the treated soil to one side, i.e., substantially all of the treated soil above the planting depth. Then it places the seed at a precise depth along a precise line—the lower edge of the foot 95. Next, the diverted soil is re-diverted or re-directed by the covering plate 117 back to the planting line and covers the planted seed, so that the seed is covered only by treated soil. Hence, the seed is not covered by a mixture of treated and untreated soil. Finally the rediverted, treated soil is firmed down over the seed by the firming wheel 80.

Application of the anti-crustant

Any suitable soil conditioner may be used for application via the jet nozzle 63. Preferably, the soil conditioner should be supplied to the nozzle in a liquid solution. Various anti-cohesion chemicals may be used, but some are better than others, for certain soils at least. A very good chemical for use in the method of this invention is one made by Nalco Chemical Company and sold under the name Nalco 2190 as a soil anticrustant; it is a blend of polymeric agents, a low molecular weight cationic polymer formulation, as described in U.S. Pat. No. 4,208,973, which describes and claims a method for reducing soil encrustation employing either polydiallyl dimethyl ammonium chloride or a polymer of dimethylamine/epichlorohydrin. That patent relies on a spray system which I have found to be much less effective than my system.

For many soils, good results can be obtained from an aqueous solution of polyvinyl alcohol, such as du Pont's ELVANOL 71-30, a medium viscosity, fully hydrolyzed grade of polyvinyl alcohol. It is a white and granular powder and is soluble in hot water.

Another material, suitable for many soils is sold by Buchman Laboratories, Inc. under the name HICAT-1; this is an aqueous solution of a high molecular weight cationic polyelectrolyte, which is readily soluble in water.

Less effective are polyvinyl alcohol in ethanol and SPAD.

There are, of course, other suitable soil conditioners that may be used with this invention, including polyacrylic acid and copolymers of vinyl acetate and maleic anhydride. Still others may be developed in the future. For the purpose of specifically illustrating the invention, Nalco 2190 will be used.

The method of applying the anti-cohesion soil conditioning material, is more important than having a good material. Table 1 shows a comparison between some experimental methods of application for reducing impedance.

TABLE I

The Effect of Method of Application of an Anti-cohesive Agent, Nalco 2190, on Impedence Reduction of a Clay Loam Soil

| Method of[1] applying Nalco 2190 | How Irrigated | Maximum Impedance[3] | |
|---|---|---|---|
| | | High[2] density soil | Low density soil |
| Check none | capillary action, plain water | 5000 | 1200 |
| Check none | surface flooded, plain water | 4000 | 2000 |
| Aggresized into soil[4] | capillary action, plain water | — | 250 |
| Aggresized into soil | surface flooded plain water | — | 250 |
| In irrigation water | capillary action, with a 10% solution | 1000 | 700 |
| In irrigation water | surface flooded, with a 10% solution | 1000 | 1000 |
| Sprayed on surface | capillary action, plain water | 3000 | 1000 |
| Sprayed on surface of aggresized soil | capillary action, plain water | — | 150 |
| Sprayed on surface | flooded, plain water | 2000 | 1000 |

[1] A 10% Nalco 2190 solution was used for all treatments.
[2] Low density soil automatically occurs when the soil is aggresized by rubbing the Nalco 2190 solution into the soil.
[3] The soil was irrigated until saturated. Impedance measurements were taken daily for 14 days when the surface was well dried. The values are in grams of force exerted on a hand held penetrometer probe of 3/32" diameter. Seedlings do not emerge when values exceed 1000.
[4] A 10% Nalco solution was applied at the rate of 4% of the soil weight.

A 10% Nalco 2190 solution at the rate of 3 to 4 percent of soil dry weight is most effective when the soil and the liquid are rubbed vigorously in small amounts by hand, which is, of course, practical only in a laboratory. Substantially equivalent results are obtained by the machine mixing at high rotational speed, described above. A distant next-best method is by spraying the chemical into soil while the soil is rotated in a cement mixer. Next best to that is by adding the chemical in irrigation water, and least effective are surface sprays. Over thirty soil types ranging from fine sands to heavy clay have been treated in several hundred laboratory trials, with impedance reduction in all ranging from fair to excellent. Some results on different soil types are given in Table 2.

TABLE 2

The Effect of Nalco 2190 on Reducing Impedance on Representative Soil Types

| Soil Location | Soil Type | Maximum Impedance[1] | | | |
|---|---|---|---|---|---|
| | | Checks | | | |
| | | dry | Agg. with water | Surface spray | Agg. with Nalco |
| Riverside | clay loam | 1700 | 1000 | 2100 | 400 |
| Rice F. Station | clay adobe | 1400 | 600 | 1500 | 400 |
| Davis | silty clay | 1800 | 3100 | 2200 | 700 |
| Davis | sandy clay | 2000 | 600 | 2400 | 200 |
| Kettleman City | fine sandy loam | 4000 | 1000 | 2800 | 250 |

TABLE 2-continued

The Effect of Nalco 2190 on Reducing Impedance on Representative Soil Types

| Soil Location | Soil Type | Maximum Impedance[1] | | | |
|---|---|---|---|---|---|
| | | Checks | | | |
| | | dry | Agg. with water | Surface spray | Agg. with Nalco |
| Kearny F. Station | fine sandy loam | 4000 | 2500 | 2500 | 300 |
| Greenfield | clay loam | 4000 | 1400 | 2500 | 300 |
| Chico | clay loam | 5000 | 4000 | 5500 | 300 |
| Salinas, Blanco | clay loam | 1000 | 1200 | 1800 | 300 |
| Salinas, Chualar | coarse sandy loam | 4000 | 800 | 3000 | 250 |
| Salinas, Gonzales | clay loam | 1500 | 700 | 1000 | 350 |

[1] The soil was aggresized with Nalco 2190, placed in pots, saturated with plain water by capillary action and allowed to dry for 10 days. The values are the same scale as in Table 1. Emergence only takes place when it occurs before impedance reaches 1000.

For all of the soils tested, the results can be summarized as follows when Nalco 2190 was well rubbed into the soil by hand:

The spatial distribution of particle size was improved.

The bulk density was decreased and aeration improved.

The size of clods was reduced and made uniform.

Water penetration became faster.

There was nearly complete lack of cohesion and bonding upon drying.

Seedling emergence was faster and more seedlings emerged.

The effects were long lasting, continuing over several months and through repeated irrigations.

There was less shrinkage and settling of the soil.

The above results were observed when pots of treated soil were wet by capillary action and dried and, to a lesser degree, when free water was poured on the surface and dried. Typical curves for a treated and non-treated, highly crusting soil, illustrating the reduction of impedance by treatment, are shown in FIG. 13. All soils tested responded similarly but to varying degrees. Naturally, non-crusting soil types showed the least effect. When the surface of both treated and non-treated soil was covered with free water, the clods of each dissociated into fine particles and settled into a smooth surface. Upon drying, the treated soil surface remained loose, non-crusted and was easily stirred with the finger. The non-treated soil crusted and turned hard. With additional water the penetration was slower in the non-treated soil, as shown in Table 3, while the treated soil continued to accept water rapidly. There was no appreciable difference in appearance between the two soils.

TABLE 3

Effect of Three Soil Conditioners on Impedance and Water Penetration

| Soil Conditioner | Maximum Impedance | Time for Water Penetration[1] |
|---|---|---|
| Water check | 3000 | 147 min. |
| PVA (EVANOL 71-30) | 1000 | 57 |
| Nalco 2190 | 300 | 49 |
| SPAD* | 1600 | 86 |

*A combination of sodium polycrylate-acylamide copolymer with sodium acrylate silicate ester, Buckman Laboratories, Inc.

1. 12 grams of conditioner were aggresized into 1200 grams of panoche clay loam. Maximum impedance was during a 10 day drying period. The values were obtained as for those in Table . Water penetration is for the time taken for 300 grams of water to enter the soil from a cylinder on the soil surface.

Effective field control of impedance was achieved with 3 to 5 gallons of Nalco 2190 in 80 to 90 gallons of water per acre when applied properly in the seed line by the machine of this invention. Application in amounts double and triple this rate showed no large advantage and had no toxic effect on the plants. Nalco 2190 is odorless, readily soluble in water, and repeated skin contact by the reasearchers caused no injury or discomfort. Rusting of metal parts was increased slightly by contact. The material is biodegradable according to the manufacturer. The cost in 1979 was around $11.00 per gallon.

Operation of the device

As noted above, the machine 10 achieves the same lack of crusting and cohesion in the field as is obtained in the greenhouse by hand rubbing. Liquid is applied to the soil in such a manner that none touched the housing 35 or any other metal parts, in order to avoid mud build-up. Mudding is avoided when the jet of liquid, at 30 to 50 p.s.i., was injected from the nozzles 63 ahead of the housing 35, through the openings 60 in the skid plate 21, so that most of the liquid is absorbed by the soil before the rotating blades 52 agitate the damp soil. Blade rotation of 400 to 600 r.p.m. leaves mud balls and irregular treated soil with unsatisfactory results. Speeds of 900 to 2000 r.p.m. are required for uniform soil coating and desired results. Higher speeds are impractical and often reduce clod sizes to granules smaller than is optimum. The proper mixing speeds cause an increase in soil volume and a decrease in bulk density. The excess volume created tends to escape and scatter at the rear of the skid plate 21, unless collected and diverted to cover the seed.

A 90-gallon-per-acre rate was used as a standard on air-dry soil and caused little color change or evidence of any liquid added to the treated zone. This amount was insufficient to cause the fine particles to aggregate or form granules. Where aggregation was desired, it was necessary to use 200 to 300 gallons of solution per acre and care taken to avoid mud problems. Damp soil requires less liquid than dry. The 90 gallon rate used showed wide adaptability for the clay loam field soils used.

Planting seed in the narrow treated band requires perfect alignment vertically and horizontally of the seed shoe 70. This is achieved, as noted above, by attaching the planting shoe 70 rigidly to the rear of the skid plate 21, so that the shoe 70 would rise and fall with the plate 21 as it traveled over irregularities in the field. The planting shoe 70 is preferably kept as narrow as possible and set so that it will not plow the opening slot deeper or wider than the treated soil, for if that happens, the seed will become covered with non-treated soil and there will be no control of impedance.

When the liquid chemical has been applied as described here under field conditions, it has always provided seed emergence zones of excellent uniformity and lack of serious crusting, cohesion, and impedance to seed depth and below.

Table 4 shows the results of one trial.

TABLE 4

Effect of Soil Additives on Emergence and Impedance in a Field Trial

| Treatment | Lettuce normal impedance[3] | Lettuce normal soil | Carrot normal soil | Carrot packed[2] soil |
|---|---|---|---|---|
| Check | 1100 | 0 | 0 | −83 |
| Nalco aggresized | 158 | +55 | +349 | +18 |
| Glass beads[1] | 933 | +38 | +33 | −51 |
| Nalco aggresized + beads | 117 | +258 | +171 | +9 |
| Nalco surface spray | 792 | +46 | +135 | −60 |
| Glass beads + Nalco surface spray | 767 | 0 | +39 | −28 |

Emergence as % change from check

[1] Small porous glass beads were a soil conditioning product used in our trials.
[2] The soil was packed by rolling a 10 pound press wheel over the seed line while the soil was very damp and before emergence.
[3] Impedance measurements were made as in Table 1. These values can change hourly in the field and are only relative. Limiting values for physical impedance is 1000, but under damp conditions a much lower value may indicate aeration problems.

To those skilled in the art of which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A method of planting seeds in a field, comprising the steps of:
    injecting at 30 to 50 p.s.i. an anti-cohesion liquid chemical into a narrow ribbon of soil no more than two and one-half inches wide and two inches deep,
    then, immediately thereafter, vigorously agitating said ribbon of soil by a bladed wheel at a speed between 900 and 2000 r.p.m., to insure coating of all of the soil particles with the chemical to a depth below that at which the seed is to be planted,
    then placing the seed at precise locations within and covered by the treated said ribbon of soil, and
    then firming the soil.

2. The method of claim 1, wherein said step of placing the seed particles diverting to one side the portion of the treated ribbon of soil which lies above a desired planting depth, placing the seed at said precise location, and then redirecting the diverted soil to cover the seed with that treated soil.

3. A method of planting seeds in a field, comprising the steps of:
    continuously moving a pivotally mounted rigid skid plate over the field along a row while
    injecting from a forward portion of the skid plate an anti-cohesion liquid chemical into a narrow ribbon of soil no more than two inches wide and two inches deep, at 30 to 50 p.s.i.,
    then vigorously agitating said narrow ribbon of soil by rapidly rotating blades carried by said skid plate at a locus to the rear of the injection apparatus, the blades rotating at a speed between 900 and 2000 r.p.m., to insure coating of all of the soil particles with the chemical to a depth below that at which the seed is to be planted,
    then placing the seed at precise locations within and covered by the treated soil from a planting shoe carried at the rear of said skid plate, and
    then firming the soil by a wheel attached to the skid plate and to the rear of said shoe.

4. The method of claim 3 wherein said step of placing the seed includes diverting to one side, by a forward portion of said planting shoe, the portion of the treated ribbon of soil which lies above a desired planting depth, placing the seed by said shoe at said precise location while said portion is diverted, and then redirecting the diverted soil by said shoe to cover the seed with that treated soil.

5. The method of claim 1 or claim 3 in which the agitating step is accompanied by addition of dry soil-conditioning material.

6. The method of claim 1 or claim 3 having, after the firming step, the step of applying additional anti-cohesion liquid chemical on said treated ribbon of soil.

7. The method of claim 6 wherein the applying step comprises applying said additional chemical only at spaced-apart intervals.

8. The method of claim 6 wherein said chemical is the same anti-cohesion chemical as in the injecting step but containing adjuvants.

9. A seed planting machine, including in combination:
a rigid frame for riding and floating on the soil,
confining means on said frame for forming a narrow band of soil no more than two and one-half inches wide and two inches deep,
jet means on said frame ahead of said confining means for injecting, at 30 to 50 p.s.i., a liquid anti-cohesion chemical into said narrow band of soil to be formed by said confining means,
a bladed rotary device on said frame following the injector means,
driving means for rotating said device at 900 to 2000 r.p.m., for vigorously agitating the soil within said narrow band to insure coating of all soil particles with said chemical to below seed planting depth, and
seed planting means supported by said frame for placing the seed at precise locations in the treated band.

10. The machine of claim 9 wherein said confining means confines substantially all the recited operations and comprises two vertical walls and an upper wall defining a tunnel, so that the conditioned soil is contained and is prevented from mixing with untreated soils.

11. The machine of claim 9 wherein said frame comprises a skid plate and a planting shoe rigidly attached to said skid plate, so that seed is placed precisely in a treated band of soil.

12. The machine of claim 11, wherein said planting shoe includes
diverting means at its forward end at the end of said confining means, for pushing to one side the treated soil of said band lying above the bottom of said shoe,
seed depositing means to the rear of said diverting means for depositing the seed on top of the undiverted soil below the bottom of said shoe, and
re-directing means to the rear of said seed depositing means for pushing the diverted soil back over the deposited seed.

13. A seed planting machine, including in combination:
a skid plate for riding and floating on the soil,
a jet nozzle mounted on said skid plate in line with an opening therethrough, for injecting at 30 to 50 p.s.i. a liquid anti-cohesion chemical into the soil along a relatively narrow band of soil no more than two inches wide and two inches deep,
wall means forming a tunnel having side walls projecting into the soil for confining said narrow band of soil to the rear of said nozzle,
a housing in line with said tunnel just to the rear of said jet nozzle,
a set of rotary mixing blades mounted on a shaft that supports and rotates said blades in said housing, drive means for rotating said shaft and blades and thereby vigorously agitating the soil at 900 to 2000 r.p.m. within said narrow band to insure uniform coating of the soil particles with said chemical to below seed planting depth, and
a planting shoe rigidly attached to said skid for planting seeds in the treated band of soil.

14. The machine of claim 11 or claim 13 wherein said shoe is followed by a firming wheel supported by said skid plate for covering and firming the soil over the seeds that have been planted.

15. The machine of claim 14 having spray means for spraying the soil with liquid, supported by said skid plate behind said firming wheel.

16. The machine of claim 13 wherein said shoe is rigidly attached to one side wall only of said tunnel at the end of said tunnel and comprises
a first wall attached directly to said side wall of the tunnel and extending straight behind it,
a second wall having a portion parallel to said side wall and an angularly extending portion extending forwardly from the forward end of said second wall to a juncture with said first wall, to divert the treated soil from said tunnel to a path on the opposite side of said second wall from said first wall,
seed depositing means in between said first wall and the parallel portion of said second wall, and
soil re-directing means attached to said shoe and having a flat generally vertical plate at and to the rear of the rear end of said parallel portion of said second wall and inclined thereto at an angle so that the rear portion of said plate is closer to said first wall than the front portion thereof.

17. The machine of claim 16 wherein the distance from the rear end of the other wall of said tunnel than that to which said shoe is attached to said first wall is substantially the same as the distance from said rear end of the other wall to the angularly extending portion of said second wall and is also substantially the same as the distance from the rear end of said second wall to said plate, to enable unobstructed flow of the treated soil during its diversion and redirection.

18. The machine of claim 17, wherein both said first wall and said second wall have a lower inclined portion extending away from the vertical portion of the first wall toward the opposite side of the tunnel, for the length of said second wall.

19. The machine of claim 18 having a funnel at the upper end of said shoe into which a flexible tube can drop the seeds, said funnel directing the dropped seeds into the space between said first and second walls, the lower inclined portion of the first wall serving to direct the seeds falling on it to the lower edge of said inclined portion and from there to the adjacent soil.

20. The machine of claim 16 having a firming wheel supported by said first wall to the rear thereof, for firming the re-directed soil over the planted seeds.

21. The machine of claim 20 having
a dispensing pipe to the rear of and in line with said firming wheel, said dispensing pipe having an outlet opening and a normally closed check valve preceding said outlet opening, valve control means for opening said check valve, and actuation means on said firming wheel for actuating said valve control means.

22. The machine of claim 21 wherein said check valve includes spring means for keeping it normally closed and said actuation means comprises a rotating hub on said firming wheel, a plurality of radially outwardly extending actuator members, and said valve control means includes a stem on said check valve and a lever fulcrumed on said pipe and connected at one end to a said stem and at the other end engaged by each said actuator means in turn as said wheel rotates.

* * * * *

UNITED STATES PATENT AND TRADEMARK OFFICE
CERTIFICATE OF CORRECTION

PATENT NO. : 4,409,910
DATED : October 18, 1983
INVENTOR(S) : Burton J. Hoyle and Timothy B.K. Lee It is certified that error appears in the above-identified patent and that said Letters Patent are hereby corrected as shown below:

Column 8, line 25, "pair or" should read --pair of--.

Column 9, line 44, after "located" insert --about--.

Column 13, line 1, after "Table" insert --1--.

Column 14, line 43, which is line 2 of claim 2,

"particles" should read --includes--.

Signed and Sealed this

Seventeenth Day of January 1984

[SEAL]

Attest:

GERALD J. MOSSINGHOFF

Attesting Officer

Commissioner of Patents and Trademarks